Aug. 6, 1940.  C. A. JONES ET AL  2,210,835
PAPER-COATING PIGMENT AND PIGMENT COMPOSITION
Filed May 25, 1939
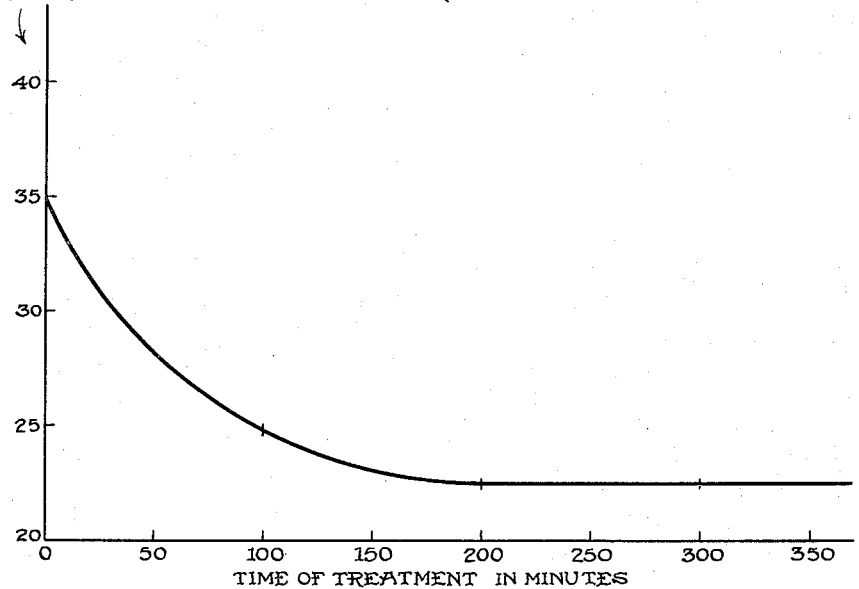
Inventors
Chester A. Jones
William J Montgomery
By K. P. McElroy
Attorney Patented Aug. 6, 1940

2,210,835

UNITED STATES PATENT OFFICE 2,210,835

PAPER-COATING PIGMENT AND PIGMENT COMPOSITION

Chester A. Jones and William J. Montgomery, Hamilton, Ohio, assignors to The Champion Paper and Fibre Company, Hamilton, Ohio, a corporation of Ohio Application May 25, 1938, Serial No. 210,060

9 Claims. (Cl. 134—20)

This invention or discovery relates to improvements in paper-coating pigments and pigment compositions; and it comprises such a pigment or composition, adapted to provide on paper a coating of lowered ink absorption and improved printing quality, and comprising finely divided, precipitated high finishing calcium carbonate which has been subjected to a mechanical rubbing action until the quantity of adhesive required to bind it to paper is substantially reduced; all as more fully hereinafter set forth and as claimed.

Calcium carbonate has long been recognized in the paper coating art as having a number of highly desirable properties, among which are its brilliant white color, high opacity and low cost. Nevertheless its utilization, while attractive, has not been general. Certain of the coarser grades have been used in dull finish coated papers, which are however only a minor proportion of coated paper production. These particular papers normally have a finish of less than 30 degrees when measured on an Ingersoll glarimeter. Due to the comparatively large particle size of this grade of calcium carbonate, it is impossible to calender this paper to a high degree of smoothness. Consequently half tone printing is not sharp and clear, and furthermore ink absorption is "spotty." This grade of calcium carbonate ordinarily requires 10 per cent or less of its weight of casein to give a coating which applied to normal coating stocks and dried and supercalendered in the normal manner will just prevent picking (detachment of particles of the coating by the ink on the printing plate) when printed with normal half tone inks.

On the other hand certain finely divided, precipitated grades of calcium carbonate have been proposed for coated paper use which can be calendered to give a smooth high finished product, but experience has shown that they require excessively large amounts of adhesive to give a sufficiently adherent coating. Also, the coating is often present on the uncalendered paper in the form of tiny mound-like aggregates—a condition associated with a kind of filter cake formation. When such paper is supercalendered, it is likely to have a mottled appearance and ink absorption is correspondingly non-uniform.

In addition to these two grades of precipitated calcium carbonate there is known a third grade, of colloidal fineness which, because of its extreme fineness and excessive absorptive properties, is of no interest in the paper coating art.

The raw material used in the preparation of our improved pigment is a calcium carbonate belonging to the second class above mentioned. That is to say it is a finely divided, high finishing, precipitated calcium carbonate which (prior to subjection to our process) requires more than 10 per cent of its weight of casein to give a coating on the usual coating stocks which after normal supercalendering will print without picking when normal half tone inks are used, and which has a finish in excess of 30 degrees measured by the Ingersoll glarimeter. Calcium carbonate conforming to this definition is what is meant throughout this application in referring to finely divided, high finishing, precipitated calcium carbonate.

One object of the present invention is to provide a pigment for paper coating compositions which possesses the advantages of high finishing calcium carbonate, but without requiring the large amounts of adhesive previously required with this material. Another object is to provide a finely divided, high finishing, precipitated calcium carbonate of a modified physical form or condition which can be used in conjunction with ordinary adhesives in ordinary amounts and by ordinary methods to give a high grade coated paper having a smooth, relatively high finish surface after supercalendering, substantially free from mottle, having a uniform and somewhat lowered ink absorption and possessing definitely improved printing qualities for certain kinds of printing over paper coated with the untreated material.

In the preparation of our improved pigment the aforesaid calcium carbonate is subjected, advantageously in the presence of some water, to a vigorous mechanical rubbing or smearing treatment. It is not actually known that the pigment particles are smeared, but the physical action used is one which could produce this result. The general method used in preparing the pigment is capable of execution in a number of different modifications, employing different quantities of water, different kinds of apparatus, and different modes of effecting the desired mechanical rubbing action upon the calcium carbonate particles. A number of these specific modifications will now be described.

One procedure for carrying out the treatment consists in circulating a fluid aqueous suspension of the described calcium carbonate between the faces of two adjacent discs forced together under moderate pressure, at least one of which is rotated rapidly. Good results have been obtained using an apparatus having for one disc a stationary, smooth, wood block and for the rotating disc a grooved disc comprising silicon carbide. Other materials for the discs may be used, including rubber, steel, and marble. The suspension of pigment is recirculated through this apparatus. Tests may be made from time to time as to the amount of adhesive necessary to add to the pigment to produce a coating composition, which when applied to a web of paper in usual ways produces a smooth, adherent coating. The calcium carbonate before treatment requires a relatively large proportion of adhesive, e. g., casein, to give good adherence to the web. The proportion required gradually becomes less as the treatment is continued, and finally, no longer decreases. At this point we stop the treatment. As a result of the treatment, the amount of casein required is reduced by 25 per cent or more as compared with the unrubbed pigment. The treated calcium carbonate, when made up with the proportion of adhesive determined by trial and applied to a web of the usual paper coating stock in the usual way, gives by the usual following operations a smooth-surfaced, uniform coated paper of brilliant whiteness and outstanding printing qualities and having a finish in excess of 30 degrees as measured by the Ingersoll glarimeter. It appears that the surfaces of the minute particles of calcium carbonate have been modified in some way by the rubbing process with a change in their relation to the aqueous adhesive. Whatever may be the explanation, the treatment results in a remarkable improvement of the coating.

Instead of smearing fluid calcium carbonate suspension between rotating discs it can be subjected to the action of rapidly rotating metal blades pressing against a stationary disc. Or the suspension may be recirculated through an apparatus similar to a tightly set Jordan. On the other hand, colloid mills employing a definite clearance between rapidly rotating members and depending for their action on shear of a liquid film, are not in general adapted for our purposes. The particles of the fluid suspension must be brought in contact with two opposing surfaces and "smeared" out under moderate pressure. The desired effect is quite different from a grinding action. In a grinding operation, the pigment particles become progressively smaller so that more adhesive is required to bind the pigment to the paper, whereas our rubbing or smearing action results in a pigment requiring less adhesive.

In addition to the lowered adhesive requirement acquired by the calcium carbonate as a result of the above described treatment, coated paper made from the product is more uniform in its absorption of printing ink. That is to say the ink lies more evenly on the paper substantially free from a spotty or mottled appearance, and this of course enhances its printing quality. Also coated paper made from the rubbed product is less absorptive to printing ink. That is to say the marked tendency of printing ink to rapidly strike into coated paper made from the untreated calcium carbonate is considerably reduced by the treatment, especially if the rubbing treatment is carried out on the calcium carbonate in the condition of a paste or dough or as a damp powder. Thus kneading a paste containing 60–90 per cent high finishing, precipitated calcium carbonate and 40–10 per cent water in a dough mixer or in a pug mill is very effective in reducing the ink absorption of coated paper made from the product.

Edge runners also produce this effect. Passing the calcium carbonate in the form of a powder between tightly set metal rolls held together by strong springs is particularly effective for this purpose. In using rolls we have found that a moisture content of from 5 to 15 per cent gives better results than when more or less moisture is present.

The reason for this decreased absorbency towards printing ink is not understood. It may be that the calcium carbonate particles become capable of being more thoroughly coated with adhesive or perhaps less adhesive is required to fill in the voids, so that in effect a denser surface or a surface exhibiting a larger proportion of adhesive may be produced on the coated paper.

In order to obtain paper coating compositions that are fairly high in solids content it is often desirable to add the calcium carbonate in substantially dry form. We have found that the method of drying the aqueous slurry of precipitated calcium carbonate greatly affects the properties of the product as a paper coating pigment. Thus if the slurry of ordinary precipitated calcium carbonate is allowed to dry without agitation, e. g., tray drying, there is no marked difference in the adhesive requirements or ink absorption of the calcium carbonate before and after drying, but if it is subjected to mechanical agitaiton during the drying operation the product requires decidedly less adhesive to form an adherent paper coating composition and produces coated paper which is definitely less absorbent to printing ink. For this purpose we have found that a rotary steam heated kiln dryer is very satisfactory in providing the desired mechanical rubbing action.

The product resulting from an agitated drying operation or from the other forms of rubbing treatment applied to the calcium carbonate in the form of a dough, paste, powder, etc., may contain lumps, but these are readily disintegrated by mixing with water with or without a dispersing agent and ball milling, ink milling, edge running, etc.

A calcium carbonate suitable for treatment according to the invention should be precipitated in finely divided form, and is advantageously produced by precipitation from hydrated lime by carbon dioxide under conditions controlled to give a fine particle size, but other processes may also be used.

In the accompanying drawing we have shown a chart illustrating the progressive diminution of the amount of casein required for satisfactory adhesion, for a particular batch of precipitated calcium carbonate treated in a particular milling device consisting of a rapidly rotating grooved alundum disc pressing against a stationary wood disc. The progress of the treatment was gaged by withdrawing samples of the mix from time to time and measuring the amount of casein required to give a firmly adherent coating on paper, that is, to give a coating which just fails to pick when printed with an ink of standard tackiness. Before treatment 35 pounds casein were required per 100 pounds calcium carbonate. After 100 minutes' treatment the amount required was reduced to 25 pounds, a reduction of 28.6 per cent, and after 200 minutes it was reduced to 22.5 pounds, a reduction of 35.7 per cent. Further treatment in this case resulted in no additional decrease. In this example, the treatment time for this batch in this apparatus is about 200 minutes.

During the course of treatment the adhesive strength of coating compositions made with the pigment increases. There is also observed a decrease in viscosity in the case of fluid aqueous suspensions. The shape of the viscosity curve is similar to that of the curve for amount of adhesive required; it has an initial high value, gradually decreasing as treatment goes on, to a low, constant value. However, the low point is reached somewhat sooner than the minimum of the casein proportion curve. Hence while viscosity measurements of the suspension during treatment give some idea of the progress, the casein consumption test described is more significant.

The following example is given as illustrating another modification of the treatment.

A slurry of calcium carbonate was prepared by passing carbon dioxide into an aqueous suspension of calcium hydroxide and controlling the conditions of precipitation to give a finely divided product. This slurry of calcium carbonate was filtered and the filter cake containing about 42 per cent solids was continuously fed into one end of a rotary drier at the rate of 2,700 pounds per hour (wet weight). The drier was 6 feet in diameter and 40 feet long, rotating at 1.5 R. P. M. and was equipped internally with banks of steam pipes. As the calcium carbonate passed through the drier it was continually rolled, dropped, and otherwise agitated by the motion of the drier. It was delivered at the other end of the drier as a powder containing about 10 per cent moisture.

This kiln dried calcium carbonate was mixed with about half its weight on the dry basis of the undried slurry of calcium carbonate, casein solution, and water to give a composition of 10 parts casein, 100 parts calcium carbonate, and 110 parts water. This mixture was ball milled for 2 hours and then recirculated a number of times between the faces of a rapidly rotating, grooved, alundum disc pressing against a stationary, wood disc. The product of this treatment was diluted with water and applied to normal paper coating stock, 5 pounds of coating (dry basis) being applied per 1000 square feet of paper surface. This coated paper was dried and supercalendered under the standard conditions set forth at the end of the specification. This coated paper had a high, uniform finish with a gloss of 37.1 degrees as measured on an Ingersoll glarimeter and just withstood picking when printed with a standard halftone printing ink. It was substantially free from mottle.

The original untreated precipitated calcium carbonate, above referred to, when made into a coating mixture with casein and applied to the paper and dried and supercalendered in the same manner required 23 parts by weight of casein in order to withstand picking on the printing press. The saving in casein is therefore 56 per cent. Furthermore, this coated paper had an undesirable mottled appearance.

Advantage may be taken of reduced ink absorption of paper coated with this product in the preparation of coated paper suitable for varnishing and for gloss ink effects. Both these grades of paper require a coating which is at the same time smooth and relatively non-absorptive to printing ink and varnish; the ink and varnish remain to a considerable extent on the surface and dry to a glossy finish. Coating mixtures suitable for gloss ink and varnishing grades of coated paper of unusual brightness may be made by use of the treated calcium carbonate.

Usually some excess casein over the amount required to withstand picking is required for this purpose. A coating mixture suitable for this purpose was prepared from a finely divided, high finishing, precipitated calcium carbonate which was first dried in a rotary drier, and then in the form of a 70 per cent aqueous slurry containing a little gum arabic as a dispersing agent, was given a severe, prolonged pebble mill treatment. This treatment differed from the normal ball mill treatment often given coating pigments in that about twice the ratio of pebbles to pigment was used and the treatment was several times as long. To the original calcium carbonate it was necessary to add casein to the extent of 25 per cent of the dry weight of the calcium carbonate to just overcome picking with a standard halftone ink; after the treatment only 11 per cent casein was required for this purpose.

To produce coating compositions suitable for varnishing and gloss ink grades of coated paper the pebble milled calcium carbonate was mixed with 19 per cent casein. When applied to the paper this coating, although containing considerably less casein than would have been required to adequately bind the untreated pigment to the paper was decidedly non-absorbent to printing ink and varnish, which is in marked contrast to the highly absorbent coated paper made from untreated calcium carbonate. Coating compositions suitable for varnishing grades of coated paper consisting of calcium carbonate and casein in which the casein is less than 20 per cent of the weight of the calcium carbonate is, so far as we know, new in the art.

The degree of improvement effected by the process depends upon the particular calcium carbonate used as a raw material and upon the particular mode of treatment chosen. Those forms of unrubbed calcium carbonate which require less than 10 per cent of casein for adequate bonding to the paper are in general too coarse to be useful for this purpose while those of colloidal fineness, i. e., those which require more than 50 per cent of casein do not give suitable coatings. Using calcium carbonate intermediate these two grades, a reduction in casein of at least 25 per cent of that required for the untreated calcium carbonate may be expected by the rubbing treatment.

While the invention has been described with reference to casein as the adhesive, the same improvements result when other aqueous adhesives are used, such as starch; the binder requirement lessens.

As is well known in the art the finish of a coated paper is affected by the severity of the supercalendering operation, per cent moisture in the coated paper, etc. In order to define our product as exactly as possible we have selected certain standard calendering conditions for testing our product. These conditions are as follows:

A normal weight of coating (e. g., 5 pounds dry weight per side per 1000 square feet of paper) is applied to the usual paper coating stocks, dried in equilibrium with air at 50 per cent relative humidity, and calendered at a pressure of 600 pounds per linear inch, by passing through the top nip of a three-roll supercalender consisting of top and bottom rolls of chilled iron, 12 inches in diameter, and middle roll of compressed cotton, 16.5 inches in diameter, on a 7.25-inch core, pressed to a hardness of 85 measured on a Shore densometer, Type D, with the coated side against the metal, twice in a direction parallel to the grain of the paper and twice at right angles to the grain, at a speed of 45 feet per minute. The calcium carbonate of our invention when mixed with a quantity of casein sufficient to give a coated paper which will just fail to pick when printed with a standard half tone ink, will be found to require between 7.5 and 25% of its weight of casein and this coating composition when tested under the conditions specified above will give a coated paper having a gloss in excess of 30 degrees as measured by the Ingersoll glarimeter.

Our rubbed calcium carbonate may be used alone with adhesive or in admixture with other pigments, but for the purposes of this test a special test composition containing only the carbonate with casein is used.

This application is a continuation-in-part of Serial No. 2430, filed January 18, 1935.

What we claim is:

1. Pigment for coated paper comprising finely divided precipitated calcium carbonate which is characterized in that when mixed with a sufficient quantity of casein its forms a coating which when applied to the usual coating stocks and dried and supercalendered in the normal manner has a gloss in excess of 30 degrees as measured by the Ingersoll glarimeter and will just withstand picking or lifting when printed with the usual half tone inks, said quantity of casein being between 7.5 per cent and 25 per cent of the weight of the calcium carbonate and said calcium carbonate further characterized in that it is prepared by subjecting finely divided calcium carbonate to a mechanical rubbing action until the amount of casein required to produce any predetermined strength of bond between the calcium carbonate and paper is reduced at least 25 per cent below the amount required prior to the rubbing treatment.

2. The pigment of claim 1 further characterized in that the calcium carbonate is prepared by reacting hydrated lime with carbon dioxide under conditions adapted to give a finely divided precipitate.

3. Paper-coating composition which comprises prises finely divided precipitated calcium carbonate 100 parts by weight and casein 7.5 to 25 parts by weight characterized in that when applied to the usual paper coating stocks and dried and supercalendered in the normal manner gives a coated paper which has a gloss in excess of 30 degrees as measured by the Ingersoll glarimeter and which prints without lifting or picking when printed with the usual half tone inks, and further characterized in that the calcium carbonate is prepared by subjecting it to a mechanical rubbing action until the amount of casein required to produce any predetermined strength of bond between the unprocessed calcium carbonate and paper is reduced at least 25 per cent.

4. Pigment for coated paper which comprises finely divided precipitated calcium carbonate characterized in that when mixed with a sufficient quantity of casein and water, and five pounds dry weight of the resulting composition, per 1000 square feet, are applied to one surface of the usual paper coating stocks, it gives a coated paper which when dried in equilibrium with air at 50 per cent relative humidity and calendered at a pressure of 600 pounds per lineal inch, by passing through the top nip of a three-roll supercalender consisting of top and bottom rolls of chilled iron 12 inches in diameter and a middle compressed cotton covered roll 16½ inches in diameter on a 7¼-inch core pressed to a hardness of 85 measured on a Shore densometer, type D, with the coated side against the metal roll, twice in a direction parallel to the grain of the paper and twice at right angles to the grain at a speed of 45 feet per minute, has a gloss in excess of 30 degrees as measured by the Ingersoll glarimeter and just withstands picking when printed with the usual half tone inks, said quantity of casein being between 7.5 per cent and 25 per cent of the weight of the calcium carbonate and said calcium carbonate further characterized in that it is prepared by subjecting it to a mechanical rubbing action until the amount of casein required to form a coating on paper which will just withstand picking when printed with a normal half tone ink is reduced at least 25 per cent below the amount required prior to the rubbing treatment.

5. The pigment of claim 4 in which the mechanical rubbing action comprises rubbing the finely divided, precipitated calcium carbonate in the presence of more than 5 per cent water.

6. The pigment of claim 4 in which the mechanical rubbing action comprises drying the calcium carbonate under conditions of agitation.

7. The pigment of claim 4 further characterized in that the calcium carbonate is prepared by reacting hydrated lime with carbon dioxide under conditions adapted to give a finely divided precipitate.

8. Pigment for coated paper which comprises finely divided precipitated calcium carbonate characterized in that it has been subjected to a mechanical rubbing treatment in the presence of more than 5 per cent of water and in that when mixed with a sufficient quantity of casein and water, and five pounds dry weight of the resulting composition, per 1000 square feet, are applied to one surface of the usual paper coating stocks, it gives a coated paper which when dried in equilibrium with air at 50 per cent relative humidity and calendered at a pressure of 600 pounds per lineal inch, by passing through the top nip of a three-roll supercalender consisting of top and bottom rolls of chilled iron 12 inches in diameter and a middle compressed cotton covered roll 16½ inches in diameter on a 7¼-inch core pressed to a hardness of 85 measured on a Shore densometer, type D, with the coated side against the metal roll, twice in a direction parallel to the grain of the paper and twice at right angles to the grain at a speed of 45 feet per minute, has a gloss in excess of 30 degrees as measured by the Ingersoll glarimeter and just withstands picking when printed with the usual half tone inks, said quantity of casein being between 7.5 per cent and 25 per cent of the weight of the calcium carbonate, and being at least 25 per cent less than is required with the same pigment in its untreated condition.

9. The pigment of claim 4 in which the mechanical rubbing comprises drying the finely divided, precipitated calcium carbonate under conditions of agitation and subsequently rubbing it in the presence of more than 5 per cent of water.

CHESTER A. JONES.
WILLIAM J. MONTGOMERY.